(12) United States Patent
Cornelison (10) Patent No.: US 8,467,073 B2
(45) Date of Patent: Jun. 18, 2013

(54) LAY LENGTH AND RATIO MEASURING DEVICE FOR ELECTRICAL CABLE

(75) Inventor: Kenneth Cornelison, Cincinnati, OH (US)

(73) Assignee: Beta Lasermike, Dayton, OH (US)

( * ) Notice: Subject to any disclaimer, the term of this patent is extended or adjusted under 35 U.S.C. 154(b) by 254 days.

(21) Appl. No.: 13/044,066

(22) Filed: Mar. 9, 2011

(65) Prior Publication Data

US 2011/0219610 A1 Sep. 15, 2011

Related U.S. Application Data

(60) Provisional application No. 61/312,392, filed on Mar. 10, 2010.

(51) Int. Cl.
*G01B 11/06* (2006.01)

(52) U.S. Cl.
USPC .................................................. 356/634

(58) Field of Classification Search
USPC .................. 356/600–640; 29/825; 702/172
See application file for complete search history.

(56) References Cited

U.S. PATENT DOCUMENTS

| | | | | |
|---|---|---|---|---|
| 3,698,818 A * | 10/1972 | Bowker et al. | ................. | 356/639 |
| 5,088,827 A * | 2/1992 | Kyriakis | ....................... | 356/638 |
| 5,339,022 A * | 8/1994 | Fleming et al. | ................. | 324/67 |
| 5,636,026 A * | 6/1997 | Mian et al. | ..................... | 356/602 |
| 7,889,327 B2 * | 2/2011 | Sikora | ............................. | 356/27 |

* cited by examiner

*Primary Examiner* — Gregory J Toatley, Jr.
*Assistant Examiner* — Jarreas C Underwood
(74) *Attorney, Agent, or Firm* — R. William Graham (57) ABSTRACT

A lay meter includes a computer based device, a light source for creating a light plane operably connected with the computer based device, a shadow based sensor a light plane operably connected with the computer based device, and signal processing circuits and software for processing sensed signals such that a clean square wave voltage signal is generated in direct response to the lays passing through the light plane.

26 Claims, 7 Drawing Sheets

Typical lay sensor location

Figure 1

Figure 2 – An embodiment to form a light plane and pair shadow

Figure 3 – Typical waveform from sensor and square wave output from signal processing Figure 4 Signal Processing to achieve clean square waveform

Figure 5

Asymmetric wave (top), symmetric divide by two (bottom)

Figure 6 – Typical lay sensor location

Figure 7

LAY LENGTH AND RATIO MEASURING DEVICE FOR ELECTRICAL CABLE

This application claims the benefit of U.S. Provisional Application No. 61/312,392 filed Mar. 10, 2010.

FIELD OF THE INVENTION

The present invention relates to a device to measure the lay length of twisted electrical wire pairs. An example of the types of wire pairs measured would be the pairs contained within a high performance four pair category network cable such as Category 5e, 6, or 6a.

BACKGROUND OF THE INVENTION

It is well known that the crosstalk performance of twisted pair cables is affected by the lay lengths of the pairs within the cable assembly. As one example of twisted pair cable designs, Category rated network cables have become more complex and have some of the highest crosstalk expectations. To provide the ability to maintain the high level of performance, it is desirable to have the ability to measure the near instantaneous lay of each wire pair. Also, due to unavoidable processing variations along the pairing, payoff, and cable assembly operations, it is also desirable to be able to measure the pair lay as the pair enters the cable assembly and becomes relatively fixed in that assembly.

It is known that the wire pairs may be subjected to stretch or rotational forces during pair assembly and during the assembly of separate pairs in to a cable. These forces have a significant effect on the pair lay. Pair rotation during the spooling and guiding of the pair in to the cable assembly causes local increases or decrease in pair lay, even if the pair was manufactured with exact and uniform lay in a prior process. Stretching can be systematic or erratic during the cable assembly process and it is desirable to monitor that effect.

It is also known that multiple (perhaps 10 to 100) pairing machines may feed a single cabling machine that assembles the pairs. However, subtle differences may exist in pair lay from machine to machine, even if the separate pairing machines have the same pair lay set point. This paring machine variation is one of the key difficulties that exist in making multiple pair cables in large quantities with consistent crosstalk performance.

A need exists for a measuring device that allows lays to be measured as well as lay ratios during the assembly of completed cable. Some cable designs may require pairing machines to deliberately change the pair lay along the length of the cable, such as described in U.S. Pat. No. 7,375,284. It is of interest to measure these varying lay lengths at subsequent process operations to ensure that the design values are actually implemented. Pair lay measurement designs that do not specifically measure such variation miss critical and unavoidable causes of crosstalk performance variation in finished cables.

To date there has been no practical way to measure pair lay length values along a length of cable. It is highly desirable to provide this information and correlate to subsequent off-line measurements.

SUMMARY OF THE INVENTION

An object of the invention is to provide a system which can monitor stretching or rotation of wires during the cable assembly process.

Another object is to make visible the subtle differences that may exist in pair lay from machine to machine, even if the separate pairing machines have the same pair lay set point.

Another object is to provide a device that measures variances in a lay pair closer to the assembly step to more accurately reflect the pair lays and pair ratios as they are captured in the cable assembly.

Still another object is to provide analysis of the crosstalk performance of the cable throughout its length by assessment in terms of lay lengths and ratios by comparing subsequent off line crosstalk testing to the measured lay values along the cable length.

This invention provides a novel and valuable insight in to the lay structure of a cable that was not previously available. This near real-time information can also be used for equipment control and feedback to the cable processing equipment. The information can also be used for post-processing cable performance analysis.

The present invention provides a measuring device that can measure the lay of single or multiple pairs by counting the number of lays passing a reference plane in a specific time period. A preferred method of counting the lays is to illuminate the measured pair with a plane of light, and measure the changes in shadow width along the pair.

In a twisted pair moving past a fixed reference plane, the shadow approximates a sine or cycloid waveform. From this signal from the pair shadow, signal processing is used to determine the presence of the lay of the pair. Using a time gate and measured speed of the pair through the reference plane, the lay is calculated.

It is part of this invention to acknowledge that variation in pair lay occurs and accordingly a sensor, signal processing, and computation hardware can be operably provided to report such variations.

It is part of the invention to provide a good resolution and low noise of relatively short lay length, for example when the lay length measurements occur with lays on the order of 0.25 inches or shorter.

It is an object to use high speed shadow measuring equipment with a sensitivity that of about 6 db signal to noise ratio or more in the shadow measurement.

It is also part of the invention that the ratio of the pairs as they enter the cable assembly as part of the assembly process is a significant factor in the crosstalk performance for any given cable construction. By measuring the ratio of multiple pairs at the same time in essentially the same location of the process, significant advantages can be attained beyond separate individual pair lay measurements. The value of each pair lay within the cable affects crosstalk performance and the ratio of these pair lays that has as much or more effect on the crosstalk than the absolute value of the pair lay, within some limits of the pair lay value.

One of the embodiments provides feedback that can compensate for random pair rotation, pair stretch, and pairing machine variations. For example, the output of the lay meter of the instant invention can be used to compensate for a) systematic offset of pairs made with a specific lay setpoint but with different pairing machines with small differences in paired lay; and/or b) random rotation that may have occurred prior to the assembly point by providing deliberate counteracting pair rotation. A pair may be deliberately stretched using tension controls, differential speed capstans, etc. at the cabler. A pair may have rotation compensation using equipment such as described in U.S. Pat. No. 4,493,182, which was previously used to provide SZ lays in a cable pair.

It is known that vibration and ambient light can affect both shadow and image capture. The light pattern of the plane of light and the detector of the instant invention are constructed to minimize the noise that may be caused by vibration/movement of the pair within the light plane. The detector can also preferably be equipped with directionality or wavelength selectivity to minimize outside light effects on the measured signal.

Image capture techniques may also be used to monitor the passing of the pair lay structure, however additional care must be taken to allow for the effect of the resulting pair lay caused by pair rotation. This pair rotation effect can be relatively invisible to image capture techniques that rely on a very short 'flash' exposure times to capture rapid image sequences. Also, image capture technology may miss an accurate count of lays passing a point when measuring a length substantially longer than the field of view of the image capture device.

The present invention also provides signal processing and waveform calculations to enable a stable count of the number of pair lays that pass the measurement plane. This step is important to minimize noise and provide a steady, consistent output value.

A significant observation and part of this invention is that the measurement of the absolute value of the pair lays as they are assembled can be secondary in importance, or even omitted. It is the ratio of the pairs in an assembly that one of the key parameters that affects crosstalk, the ratio of the pairs can be measured, calculated, and displayed in the absence of any inputs to determine the absolute value of the pair lays.

It is also important that the instant invention uses a light source that results in a thin illuminating light plane, such that the plane of light that measures the shadow width has a thickness that is less than about a predetermined length of the shortest lay to be measured by the equipment, for example, less and $\frac{1}{5}$ and preferably $\frac{1}{10}$ or less. This allows the structure of the pair to be clearly identified. With thicker light planes, the shadow will essentially contain both wide and narrow portions of the pair lay structure, and the pair shadow variations will be less distinct.

It is also part of this invention to allow measurements at wide range of pair speed through the measurement plane. The rate of lays through the measurement plane may range from about 2 to 1000 per second. The use of low noise, high speed equipment with appropriate signal processing allows this wide range of lay measuring speeds.

The present invention provides a computer based device with the ability to calculate, display, capture and store the lay length and lay ratio data. Software is operably provided on the computer-based device for adjusting for the lay effect of the cabling machine twist to the assembly, or displaying the data on a time axis or using fast Fourier transform (FFT) techniques to display on a frequency axis. Calculations may include the expression of pair lay as measured along the helix path of the pair within the assembly, or pair lay as measured along a central longitudinal axis of the cable assembly.

DETAILED DESCRIPTION OF THE
EXEMPLARY EMBODIMENTS

Figure 1:
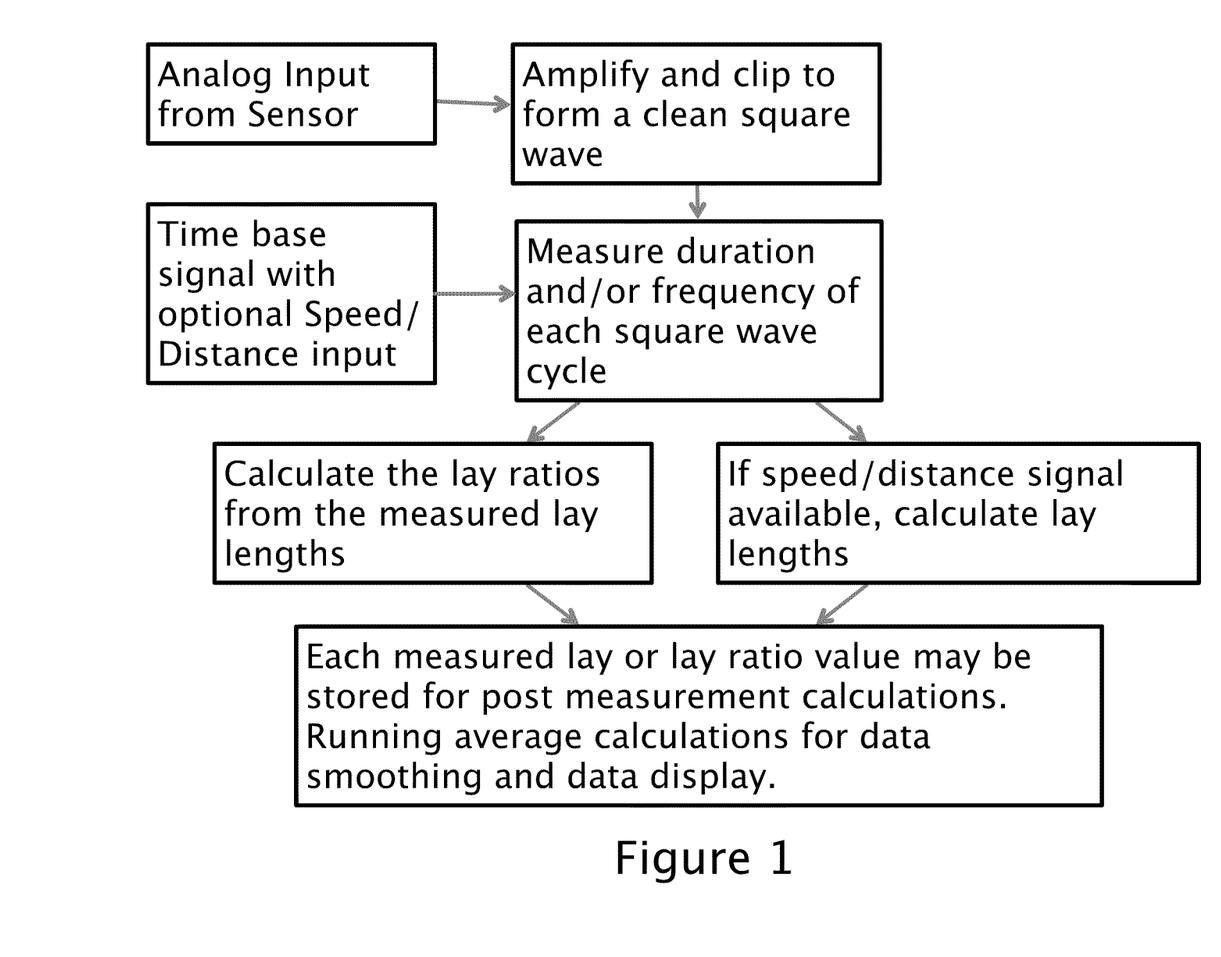
FIG. 1 is a view of a block diagram of hardware to implement a lay measurement system.

Referring to Figures, the device for measuring lay length of twisted electrical wire pairs of the present invention is generally designated by the numeral 10. The device 10 includes a computer based device 12 having hardware, display, data storage memory, operating software, and lay length software operably disposed thereon. The computer based device 12 is operably connected to a light source 14 and a light detector/meter 16. There can be one or more light source 14 and light detector/meter 16 operably disposed along the length of cable pair 18. The computer based device 12 employs the lay length software which can preferably be equipped with signal acquisition and processing capability. There can also be more than one set of light sources and detectors connected to computer device 12 to measure multiple pairs at one time.

The lay length software residing on computer based device 12 can provide signal processing and waveform calculations to enable a stable count of the number of pair lays that pass the measurement plane. This step is important to minimize noise and provide a steady, consistent output value.

A significant observation and part of this invention is that the measurement of the absolute value of the cable pair 18 lays as they are assembled can be secondary in importance, or even omitted. It is the ratio of the cable pairs 18A to 18B (see FIG. 7) in an assembly that is one of the key parameters that affects crosstalk between adjacent cable pairs 18A to 18B. The present invention provides for the ratio of the cable pairs 18A to 18B to be measured, calculated, and displayed in the absence of any speed inputs to determine the absolute value of the cable pairs 18A to 18B lays.

Figure 2:
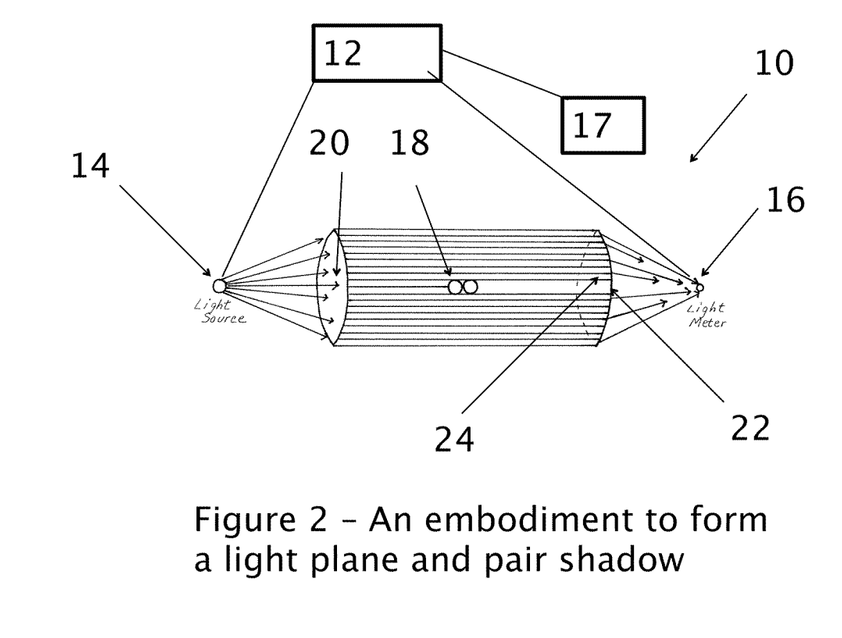
FIG. 2 is a view of the measuring plane in relation to the pair moving through the plane.

It is also important and notable that the instant invention uses a light source 14 that results in a thin illuminating light plane 20, such that the light plane 20 as it passes by the cable pair 18 provides a shadow width 22 which has a thickness that is less than about $\frac{1}{5}$ the shortest lay to be measured by the device 10, and preferably $\frac{1}{10}$ or less. The present invention 10 provides a device and method where by the structure of the cable pair 18 can be clearly identified at various stages of the assembly process.

The light source provides a plane of light significantly wider than the cable pair 18 width with a plane thickness no thicker than about $\frac{1}{5}$ of the pair lay. This light source can be continuous, flashed at a rapid rate, or a beam scanned across the width of the illuminating plane. Light detector/meter 16 is employed to enable measurement changes in the received light that are approximately proportional to the instantaneous width of the cable pair 18 as it passes through the light plane 20.

Figure 6:
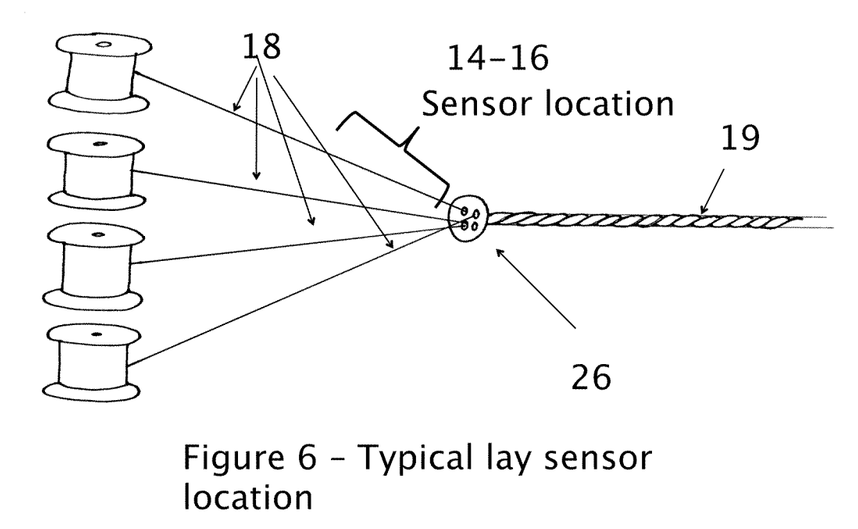
FIG. 6 is a view of a preferred location of multiple sensors to capture the effects of process variations on pair lay immediately prior to capture in the cable assembly.

These lay sensors (light source 14-detector 16) may be placed at various locations in the cable processing such as at the pairing machine or at a pair rewinding machine. Preferably, the sensor is located near the point at which the cable 18 pairs come together and form cable assembly 19. At this point, measurements include the full effect of the pair rotation and stretching immediately prior to being physically captured in the cable assembly 19. When measuring lay ratios is desired, multiple lay sensors can preferably be employed, usually with one lay sensor (light source 14-detector 16) for every cable pair 18 in the cable assembly 19.

By providing a relatively thicker light plane 20 relative to the cable pair 18, the shadow 22 will essentially contain both wide and narrow portions of the cable pair 18 lay structure due to the inherent winding of the cable pair 18, and the cable pair 18 shadow measurement variations will be less distinct. For example, with cable 18 pair lays of about 0.25 inch, the light plane 20 would be about 0.05 inches in thickness or less. The width of the light plane 20 is preferably significantly wider than the cable pair 18 width.

Figure 7:
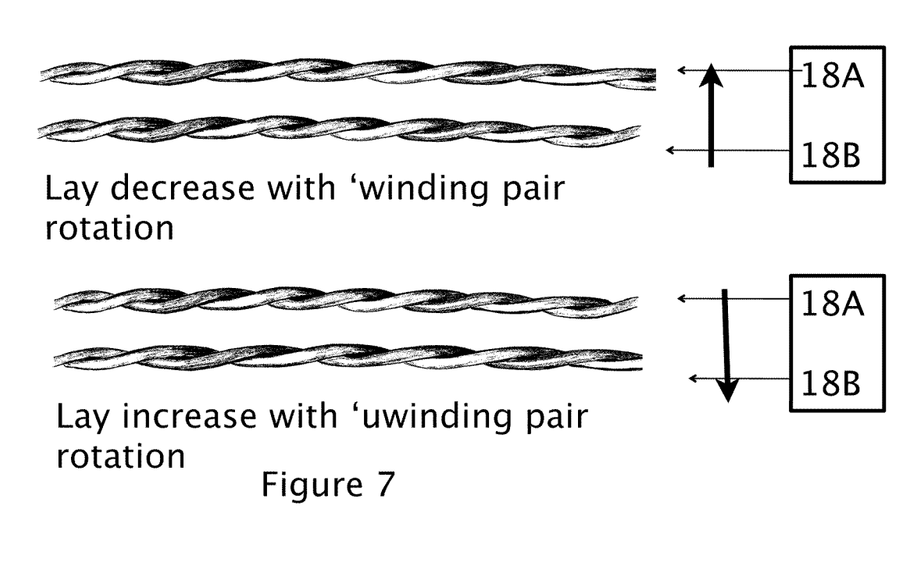
FIG. 7 is a view of the effect of the lay length when the pair is subjected to rotation as it enters the cable assembly equipment.

The performance of cable pairs 18A and 18B, for example, will generally improve by using overall shorter cable pair lays. The shorter lays help reduce both internal and alien crosstalk (crosstalk from cable assembly to cable assembly). However, as the lay length is decreased, the apparent max and min shadow values tend to converge and become less distinct for a given light plane thickness.

The device 10 provides a good resolution and low noise in the lay length measurements even with lays on the order of 0.25 inches or shorter. This is accomplished by using high speed shadow measuring equipment that maintains a decibel sensitivity of at least about 6 db signal to noise ratio or more in the shadow measurement. The invention also allows measurements at wide range of pair speed through the measurement plane 24. The rate of lays through the measurement plane may range from about 2 to 1000 per second. The use of low noise, high speed equipment with appropriate signal processing allows this wide range of lay measuring speeds.

The present invention also provides for the ability to display, capture and store the lay length and lay ratio data in the computer based device 12. Calculations can be performed on the captured data using the lay length software of the instant invention. They include adjusting for the lay effect of the cabling machine 26 to twist to the assembly, or displaying the data on a time axis or using FFT techniques to display on a frequency axis. Calculations may include the expression of pair lay as measured along the helix path of the pair within the assembly, or pair lay as measured along a central longitudinal axis of the cable assembly.

If the value of the cable pair 18 lay(s) is desired, a speed sensor 17 can be operably employed on the processing equipment (connected to computer based device 12) that is used in subsequent calculations. Pulse or voltage outputs are common speed signal formats from the cable assembly equipment.

Figure 3:
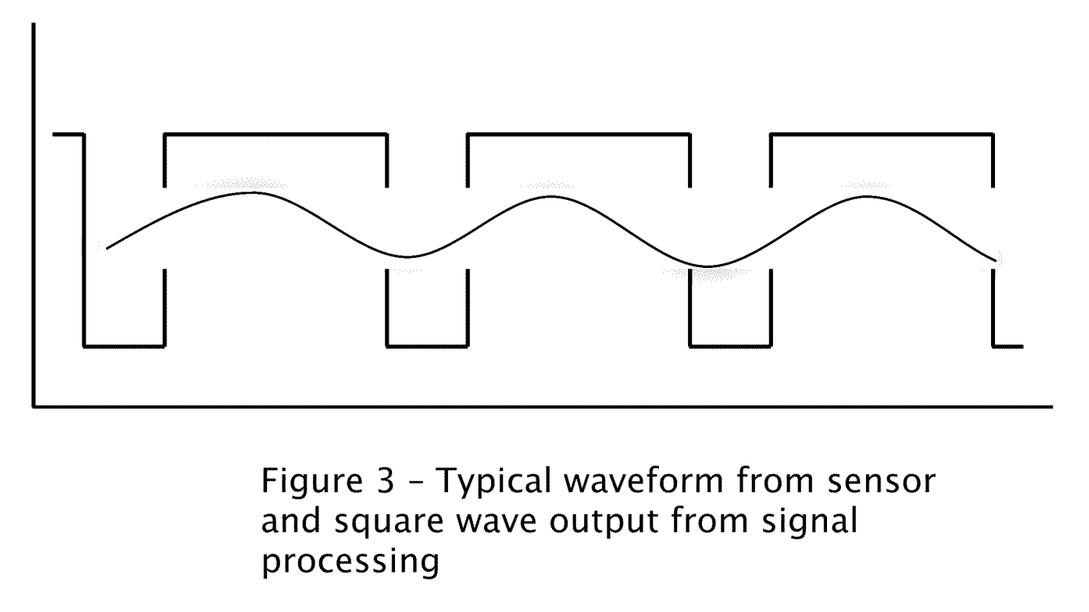
FIG. 3 is a waveform of the pair lay shadow obtained from a light sensor and the resulting square wave output from the signal processing.
Figure 4:
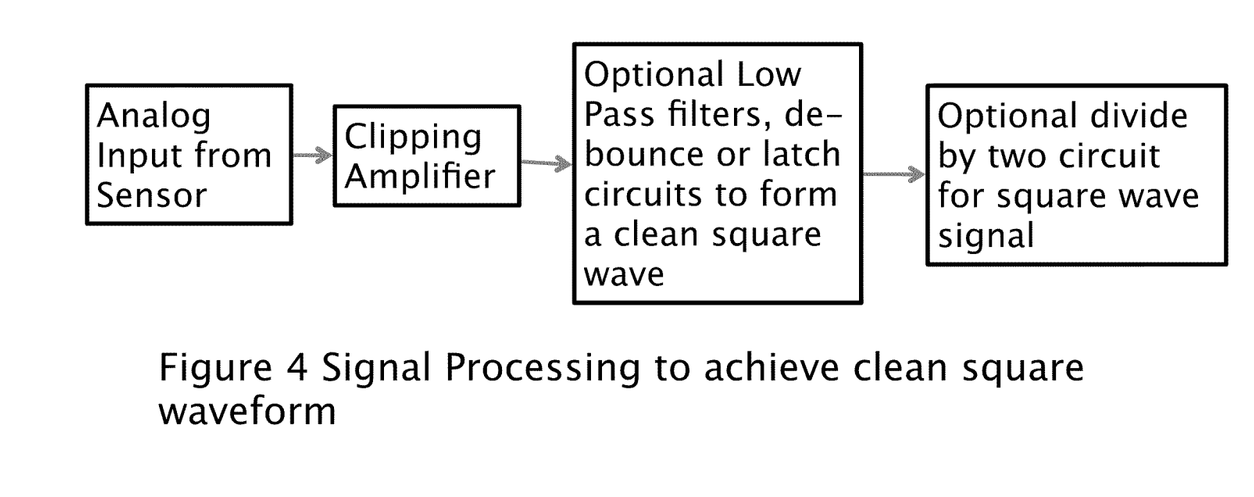
FIG. 4 is a view of a signal processing steps.

The preferred embodiment provides a clean, square wave derived from the analog signal from the sensor (light source 14-detector 16). A signal processing circuit is employed to convert the somewhat noisy cycloid shaped analog signal from the sensor to a clean square wave signal. Several techniques are possible, but the preferred method is to amplify and clip the analog waveform. An example is a circuit with a gain of about 40 to 60 db along with a clipped signal output at a pre-determined value that can correspond to power supply voltage rails. Some sensors have an output that has an average voltage that varies with the size of the twisted pair. AC coupling is preferably used in the processing circuit to remove the average voltage component from the signal processing circuit. The advantage is that different size pairs may be measured without changing set points of the processing circuit. Pre-emphasis and de-glitch processing can also be required to ensure clean and distinct edges of the square wave. An example of further processing can include a low pass filter from the first amplifier and a subsequent clipping amplifier. The low pass filter can have a cutoff frequency as low as $\frac{1}{10}$ the rate of the pair lays through the measurement window to sufficiently clean the square wave edges. Frequency dependent filters may be required to improve signal processing capability to allow a wider range for the rate of pair lays through the measurement window.

The conversion to a square wave provides independence between the magnitude of the signal from the sensor, size of the moving pair, and the waveform shape created by the moving pair. In this method, the approximately cycloid or sine wave shape is converted to a square wave and the processed waveform is independent of the overall pair diameter. In this way, complex comparators or absolute voltage values from the sensor are not required to evaluate the overall or instantaneous pair shadow size.

Figure 5:
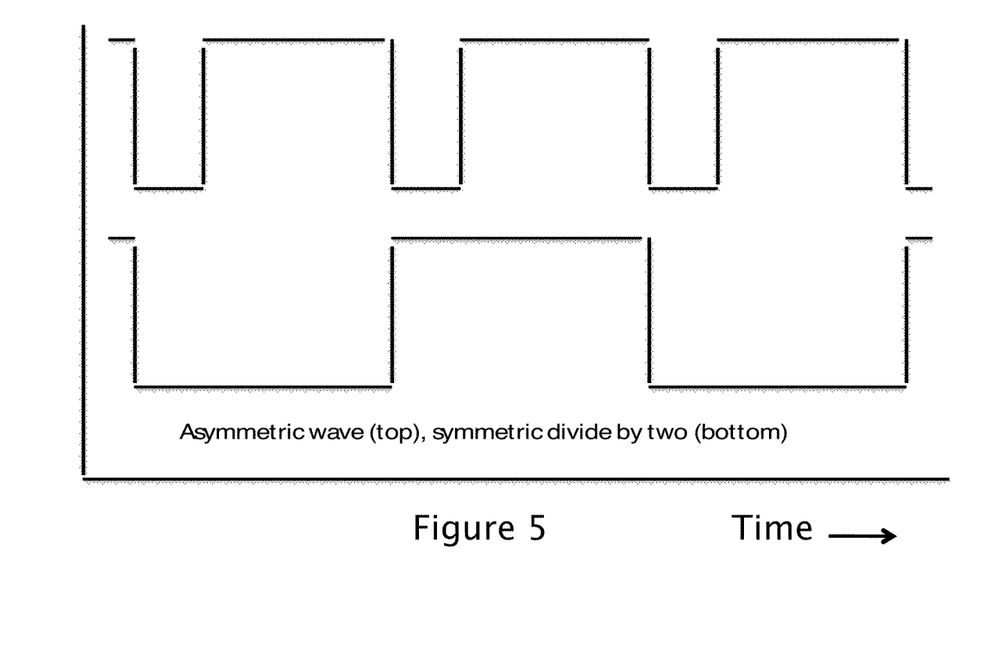
FIG. 5 is a view of a square wave output with a 'divide by two' step included.

It is expected that the shadow waveform will not be symmetrical, and square wave conversion may result in a clean, but non-symmetrical square waveform. Another option is to implement a 'divide by two' step to result in a more nearly symmetrical waveform to facilitate further data acquisition and processing.

Data acquisition hardware is used to enable the square wave to be captured in to computer based device 12 for subsequent counting and analysis. This provides the ability to update the calculation of frequency or count within the time interval of a lay length or a few lay lengths. Because there are two cycles of the cycloid wave shape for every lay length, it is possible to measure the length of each half-lay length.

Computer processing hardware and lay length software are used to calculate the lay counts and frequencies. By having the simultaneous input from multiple cable pairs, (e.g., 18), the lay ratios can be calculated. Also when speed input is employed, the lay lengths can also be calculated. Lay length software can be used to further enhance the calculated values, by applying averaging techniques, or providing specific response characteristics to changing pair lay or ratio values.

Certain adjustments to the observed values can also be applied using the lay length software. For example, the cable pairs 18 are in a helix form in the assembled cable 19 that results in a longer pair length compared to the axial length of the completed cable. An option can be provided to calculate the pair lay as observed along the length of the helix pair path, or as observed along the central cable axis. Adjustments may be made to the observed lay values to compensate for the known pair twisting caused by the cable assembly equipment.

Display of the computer based device 12 is used to provide real time visual output, preferably with a moving time graph showing the values of the pair lays or ratios as they occur over time. Also, a real time FFT analysis of pair ratio/lay variation may be displayed, either as a single frequency plot or as a waterfall view over a longer time period.

The computer based device 12 can then store the captured lay information as well as calculated information in a database for subsequent processing and analysis. One use of such stored data may include cutting a long (several thousand feet) cable in to 100 to 300 ft lengths, conduct an offline crosstalk test for that specific cable segment, then compare that offline test to the lay length data for that specific cable segment.

Another use of the data is to provide ratio or lay data with correlation to specific upstream equipment. For instance, variations in the lay provided by multiple pairing machines that feed a cabling machine can be tracked and correlated.

A novel part of the invention is providing a novel method to measure pair lays and ratios. However, with that novel method employed, it is also the purpose of this invention application to additionally include the optional use of this source of real time lay information to adjust the operation of the process equipment in real time to correct for deviations from the desired lay or lay ratios. Specifically, input tensions to the cabling equipment can be adjusted to result in controlled stretch to adjust the pair lay as assembled close to the desired value. Optionally, equipment previously used to provide S-Z lay in pairs can be used to compensate for undesirable random pair rotation as it occurs during the cable processing steps.

While particular embodiments have been chosen to illustrate the invention, it will be understood by those skilled in the art that various changes and modifications can be made therein without departing from the scope of the invention as defined in the appended claims.

What is claimed is:

1. A lay meter which includes:
   a light plane;
   a shadow based sensor operably disposed in a field across from said light plane to receive a shadow cast from a lay pair passing through said light plane and generates a signal corresponding to a lay width; and
   a signal processing circuit operably connected to said shadow based sensor to receive said signal such that a clean square wave voltage signal is generated in direct response to the lay passing through said light plane.

2. A lay meter according to claim 1, wherein said light plane has a thickness less than about ⅕ a shortest lay to be measured.

3. A lay meter according to claim 1, wherein said light plane width is wider that a width of the lay pair.

4. A lay meter according to claim 1, wherein said signal processing circuit is equipped for sensing said lays passing said plane at a rate from about 2 to 1000 lays per second.

5. A lay meter according to claim 1, which includes a plurality of shadow based sensors operably disposed in a field across from said light plane to receive a shadow cast from a plurality of lay pairs passing through said light plane, such that lay ratios may be measured for multiple pairs.

6. A lay meter according to claim 1, which further includes a computer based device and a speed sensor operably connected to said signal processing circuit to further calculate lay length of a cable pair.

7. A lay meter according to claim 1, which further includes a computer based device and a display operably connected to said signal processing circuit for displaying measured lay length.

8. A lay meter according to claim 1, which further includes a computer based device and computational hardware for signal processing from the sensor.

9. A lay meter according to claim 8, which further includes computational hardware and software for fourier transform processing on said lay signal.

10. A lay meter according to claim 8, which further includes software and hardware for calculating lay compensation for one of cable construction and cable assembly twisting.

11. A lay meter according to claim 6, which further includes a speed sensor operably connected to said signal processing circuit to further calculate lay length of a cable pair and data storage for storing data corresponding to said lay length for analysis and correlation with post manufacturing test results.

12. A lay meter, comprising:
    at least two lay length sensors equipped for generating a signal indicative of lay length upon lays passing thereby, and
    at least one signal processing circuit for each lay length sensor and connected to computational hardware and software, a display, and data storage, said circuit operably connected to said sensors to receive said signal such that a clean square wave voltage signal is generated in direct response to the lays passing by said sensors and wherein said circuit produce a lay ratio signal for computation, display, manipulation and storage.

13. A lay meter according to claim 12, which further includes a speed sensor operably connected to said circuit to further enable lay length measurement, display, manipulation, and storage thereof.

14. A method of producing an electrical cable, which includes the steps of: (a) employing a lay length meter having lay length sensor equipped for generating a signal indicative of lay length upon lays passing thereby, and at least one signal processing circuit having computational hardware and software operably connected to said sensor to receive said signal such that a clean square wave voltage signal is generated in direct response to the lays passing by said sensors; (b) employing cable assembly equipment feedback and control obtained from said lay length meter; and (c) producing electrical cable in accordance with one of a specific pattern and value of lay ratio as a function of said signal and said feedback.

15. The method of 14, which is further characterized such that selected lay pairs are systematically adjusted through one of tension control and differential speed capstan input of the pair.

16. The method of 14, which further includes compensating for lay variation in pair rotation as observed through said lay length meter.

17. The method of 14, wherein said lay length meter a speed signal sensor, display, and storage capability all of which are operatively connected to said signal processing circuits such that lay lengths can be measured, displayed, manipulated, and stored.

18. A lay meter which includes:
    a light plane;
    a shadow based sensor operably disposed in a field across from said light plane to receive a shadow cast from a lay pair passing through said light plane and generates a signal corresponding to a lay width;
    a signal processing circuit operably connected to said shadow based sensor to receive said signal such that a clean square wave voltage signal is generated in direct response to the lay passing through said light plane;
    a computer based device operably connected to sensor and signal processing circuit;
    a speed sensor operably connected to said computer based device to calculate lay length of said pair; and
    a display operably connected to said computer based device for displaying measured lay length.

19. A lay meter according to claim 18, wherein said light plane has a thickness less than about ⅕ a shortest lay to be measured.

20. A lay meter according to claim 18, wherein said light plane width is wider that a width of the lay pair.

21. A lay meter according to claim 18, wherein said signal processing circuit is equipped for sensing said lays passing said plane at a rate from about 2 to 1000 lays per second.

22. A lay meter according to claim 18, which includes a plurality of shadow based sensor operably disposed in a field across from said light plane to receive a shadow cast from a plurality of lay pairs passing through said light plane, such that lay ratios may be measured for multiple pairs.

23. A lay meter according to claim 18, which further includes computational hardware and software for fourier transform processing on said lay signal.

24. A lay meter according to claim 18, which further includes software and hardware for calculating lay compensation for one of cable construction and cable assembly twisting.

25. A lay meter according to claim 18, which further includes data storage for storing data corresponding to said lay length for analysis and correlation with post manufacturing test results.

26. A lay meter according to claim 23, wherein the fourier transform processing enables a waterfall display.

* * * * *